United States Patent Office 2,844,612
Patented July 22, 1958

2,844,612
PRODUCTION OF ESTERS FROM CARBON MONOXIDE, HYDROGEN, AND OLEFIN

Walter Rottig, Oberhausen-Sterkrade-Nord, Germany, assignor to Ruhrchemie Aktiengesellschaft, Oberhausen-Holten, Germany, a German corporation No Drawing. Application November 5, 1953
Serial No. 390,413

Claims priority, application Germany November 27, 1952

6 Claims. (Cl. 260—410.9)

This invention relates to improvements in the production of esters. It more particularly relates to the production of esters by the catalytic addition of carbon monoxide hydrogen-containing gas to higher molecular unsaturated aliphatic hydrocarbons.

The catalytic addition of carbon monoxide and hydrogen to olefins to form aldehydes is well known. This process is termed the oxo-synthesis. By means of the oxo-synthesis aldehydes, and by subsequent hydrogenation thereof alcohols of various molecular sizes ranges from $C_3$ through $C_{24}$ have been produced. In practice, however, the oxy synthesis has been limited to low-boiling fractions containing hydrocarbons having a carbon number of between 3 and 18, and preferably of between 6 and 15. Higher molecular weight unsaturated hydrocarbons have very rarely been used in the oxo-synthesis, since starting materials of this type in most cases have only a relatively low content of higher-molecular weight olefins, thereby rendering the synthesis uneconomical due to large quantities of unreactive material which had to be treated. In addition, under these conditions the side reactions of the oxygenated products produced with one another would increase to a relatively high extent. Finally the processing of the reaction products obtained from the oxo-synthesis of these higher-molecular weight hydrocarbons is difficult and expensive to carry out due to the low concentration of the desired oxygenated compounds contained therein.

One object of this invention is the production of esters by the catalytic addition of carbon monoxide and hydrogen to higher molecular unsaturated hydrocarbons. Still further objects will become apparent from the following description:

It has now been found in accordance with the invention that reaction products mainly containing esters may be produced by treating products containing unsaturated aliphatic hydrocarbons boiling above 290° C. with gases having a $CO:H_2$ ratio of above 1:1, and preferably above 2:1 at a temperature of between 100 and 200° C. and a pressure of between 100 and 300 atmospheres in the presence of a conventional oxo synthesis catalyst, such as a cobalt catalyst. The carbon monoxide-hydrogen mixtures may contain as much as 50 parts by volume of carbon monoxide per part by volume of hydrogen.

The process in accordance with the invention may be effected with all of the catalysts heretofore suggested for the oxo synthesis. It is possible to operate with the usual reduced cobalt catalysts as conventionally used for the catalytic carbon monoxide hydrogenation. Catalysts of this kind consist, for example, of 200 parts by weight of kieselguhr, 100 parts by weight of cobalt, 5 parts by weight of thorium oxide ($ThO_2$) and 8 parts by weight of magnesia ($MgO_2$). These catalysts are prepared, for example, by precipitation with soda solution from corresponding salt solutions and are reduced, after drying of the precipitated catalyst mass, with hydrogen at about 350° C. within 60 minutes. After the reduction these catalysts have a reduction value of 63%, i. e. 63% of the present cobalt consist of metallic cobalt, the remainder being cobalt-oxygen compounds. The addition of water gas may also be effected in the conventional manner with cobalt salts, as, for example, with cobalt salts of fatty acids, cobalt sulfates or cobalt acetate, it being possible to apply the cobalt salts in the form of aqueous solutions or dissolved in organic solvents. Finally, the process may also be effected with cobalt carbonyl compounds, especially cobalt hydrocarbonyl. In this case, use is made of cobalt salt solutions which form such cobalt carbonyl compounds. The use of cobalt carbonyl catalysts of this kind has often been described in the technical literature and is known in all details to the expert familiar with the oxo synthesis.

The use of carbon monoxide-rich gases in the oxo-synthesis is known. Thus, for example, diethyl ketone has been produced by treating ethylene with gases which contain 2 to 50 parts by volume carbon monoxide per part by volume hydrogen. Other processes have been described which preferably use equivalent quantities of carbon monoxide and hydrogen or gases which contain 0.5 to 1 part by volume of hydrogen per part by volume of carbon monoxide. In these known processes, however, relatively low-molecular weight olefins were treated, as, for example, olefinic fractions of $C_7$ hydrocarbons.

In contrast to these known processes, the process in accordance with the invention uses high molecular weight unsaturated hydrocarbons having a carbon number above $C_{16}$ as the starting product. Very unexpectedly by the combination of these higher-molecular weight unsaturated hydrocarbons and the carbon monoxide-rich gases mainly esters are formed as the reaction products.

As starting materials for the process in accordance with the invention there may be used various unsaturated hydrocarbons which boil above 290° C., and which contain hydrocarbons of a carbon number of above $C_{16}$ as the main constituents.

Preferably for starting products in accordance with the invention there are used products obtained from the catalytic hydrogenation of carbon monoxide using iron catalysts and which contain a high paraffin content, as, for example, more than 20% and preferably more than 40%, based on the liquid products. The iron catalyst for the production of the synthesis products may be produced in the conventional manner by precipitation as well as by fusion or sintering processes. Products particularly suitable for use as starting products in accordance with the invention may be obtained from a carbon monoxide hydrogenation effected with precipitated iron catalysts which in the finished reduced state contain 30–50% of their iron content in the metallic state. The synthesis itself may be effected, for example, with fixed bed catalysts or with suspended catalysts.

As preferable starting products there may be used hydrocarbons having an initial boiling point above 350° C. and a carbon number of above $C_{20}$. These products were frequently commercially and economically difficult to utilize, due to their almost pure hydrocarbon structure.

The treatment of these higher-molecular weight unsaturated hydrocarbons with the carbon monoxide-rich mixtures of carbon monoxide and hydrogen is effected in the conventional manner for the oxo-synthesis with the use of the known solid or liquid oxo-synthesis catalysts, such as cobalt catalysts, at a temperature between 100 and 200° C. and a pressure of between 100 and 300 atmospheres. If in the process, the carbon monoxide-hydrogen ratio is increased from a ratio of 1:1 to a ratio of 2:1, and above, ester formation is observed to an increasing extent. An extensive formation of esters takes place when the gas having a carbon monoxide to hydrogen ratio which ranges above 2:1 is used.

Very surprisingly and unexpectedly the products of the process in accordance with the invention contain practically no aldehydes, which are the conventional products of the oxo-synthesis. In addition to the esters which are principally obtained, alcohols and acids are also obtained. The acids which are frequently undesirable, may be removed from the product, if required, by washing with caustic, or may be esterified in the conventional manner with alcohols, preferably with the alcohols which are obtained in the product in addition to the acids. In this manner, practically acid-free esters may be obtained, which contain only a small portion of free alcohols. The properties of these products with respect to their structure and chemical and physical behavior are about the same as those of natural waxes, and they may therefore be utilized for numerous purposes in industry in a favorable manner as contrasted with the starting materials. The following examples are given by way of illustration and not limitation:

*Example 1*

For the production of the catalyst used for the carbon monoxide hydrogenation, 1000 liters of a hot solution which contained per liter 40 grams Fe as $Fe(NO_3)_3$ and 2 grams Cu as $Cu(NO_3)_3$ were combined with 1050 liters of a hot solution which contained 100 gms./liter of $Na_2CO_3$, while vigorously stirring. The mixture was stirred until the carbon dioxide split off had completely escaped, while constantly maintaining the mixture boiling.

After the termination of the precipitation, the pH value was 7.0. The precipitated metal compounds were separated from the solution in a filter press and immediately thereafter washed for 30 minutes with hot condensed water at a pressure of 3 kilos/sq. cm. to remove the alkali present as far as possible. While maintaining a pH value of 7.0, the alkali content of the filter cake could without any difficulty be reduced so far that it was 0.4 part $K_2O$ per 100 parts of iron. If, deviating herefrom, the precipitation was effected in the alkaline range, the residual alkali content could hardly be reduced below 1.5–2 parts $K_2O$ per 100 parts of iron in spite of a considerably extended washing time.

The washed filter cake was at first pasted with a little water in a mixing vessel to effect as extensive as possible a dispersion of the moist mass. For this purpose, each 100 kilograms of the moist filter cake was combined with 30 liters of water. Following this, the dispersed catalyst mass was mixed with additional 350 liters of water until a uniform suspension of approximately a syrupy condition was obtained. Immediately thereafter, 17 kg. potassium water glass were added, which contained 8.1% $K_2O$ and 20.5% $SiO_2$.

The suspension thus impregnated with potassium water glass was mixed for the purpose of neutralization with 2.1 liters of nitric acid (48% $HNO_3$) for every 100 kg. of the moist filter cake. In doing so, the acid was added in a thin jet, while vigorously stirring. After the neutralization, the suspension was separated from the solution in a filter press. The separated filter cake contained 4.6 parts $K_2O$ and 23 parts $SiO_2$ for every 100 parts of iron (Fe).

The filter cake was molded, without recycling dust-like portions, into cylindrical pieces of 2–4 mm. diameter and 3–6 mm. in length thus producing extremely hard and resistant catalyst grains. These grains were reduced for 60 minutes at 230° C. with a hydrogen-nitrogen mixture using a gas flow velocity of 1.5 m./second (measured linear and cold). The finished reduced catalyst contained 26% of the present iron in the form of free iron.

Over this catalyst, water gas was passed at a synthesis pressure of 10 atmospheres and a load of 100 parts by volume of gas per part by volume of catalyst per hour. The catalyst was arranged in a double tube, the annular space of which had a diameter of 24 x 44 mm. The recycle ratio used was 1:2.5. The synthesis temperature was 213° C. The resulting liquid product contained about 75% of compounds having a boiling point of above 320° C. The compounds consisted practically exclusively of saturated and unsaturated hydrocarbons.

250 grams of this product were treated for 2 hours in a high pressure autoclave in the presence of 8 grams of a cobalt catalyst, which had been prepared from cobalt nitrate solutions with the use of gieselguhr in the manner described above, with a gas consisting of 63.5% carbon monoxide, 30% hydrogen, the balance being nitrogen, at a reaction temperature of 125° C. The pressure at this temperature was 100 atmospheres and was maintained at this level throughout the test. While the iodine number of the starting product was 17, it was only about 1 after the termination of the reduction. The hydroxyl number which was previously 19 and afterwards 17 was almost unchanged. The carbonyl number was about 2. However, a neutralization number of 2.4 was now present as compared with originally 0.1. The ester number which was previously 0 was now 12.8.

*Example 2*

A fused catalyst of conventional production, which contained, in addition to iron, certain quantities of copper, alkali and barium oxide, was reduced with hydrogen at 350° C. and brought to reaction at a synthesis pressure of 15 atmospheres, a catalyst load of 150 parts by volume of water gas per part by volume of catalyst per hour and a temperature of 211° C. The resulting liquid product contained 28% compounds boiling above 320° C.

In an oxonation of this product with the use of a catalyst which consisted of an aqueous solution of cobalt sulfate, the iodine number which was previously 13, decreased to practically 0. The hydroxyl number remained at a practically constant value of 15. The carbonyl number which was previously 0 was, after the test, 1. However, the product had now a neutralization number of 1.5 and an ester number of 19.5.

*Example 3*

A precipitated catalyst consisting of 100 parts of iron, 25 parts of copper, 5 parts of $K_2O$ and 25 parts $SiO_2$ was prepared. This catalyst was reduced for 60 minutes at 150° C. with a carbon monoxide-containing gas having a $CO:H_2$ ratio of 1:1.7. After the reduction, the catalyst had a reduction value of 27% of free iron based on total iron.

This catalyst was operated in a synthesis tube of 12 m. in length and 50 mm. inside diameter at a synthesis pressure of 30 atmospheres, a load of 500 liters of gas per liter of catalyst per hour, a recycle ratio of 1:2.5 and a temperature of 225° C. The $CO+H_2$ conversion was 77%. The gas used for the synthesis had a $CO+H_2$ content of 85% and a $CO:H_2$ ratio of 1:1.7. The resulting liquid product contained 65% constituents boiling above 320° C. and chiefly consisting of saturated and unsaturated hydrocarbons.

250 grams of this product were reacted at 125° C. with a gas consisting of about 63% carbon monoxide, 30% hydrogen, the balance being nitrogen, in the manner described in Example 1. The pressure was 120 atmospheres.

After the termination of this experiment, the iodine number was 0 as compared with 16 in the starting product; the hydroxyl number which was previously 18 had slightly dropped to 16. The neutralization number was 3.7, the ester number was 12.7. The carbonyl number was 3 as compared with 0 in the starting product.

By dissolution in a boiling $C_8$ fraction with the addition of little p-toluene sulfonic acid, the neutralization number could be decreased from 3.7 to 0.9. At the same time, the ester number increased from 12.7 to 15.1, while the hydroxyl number dropped by 2 units.

If the content of carbon monoxide was reduced and the hydrogen content increased as to have a $CO:H_2$ ratio of 1.5:1, there was obtained under these conditions a product which had an increased carbonyl number of 6 and a decreased neutralization number of 3.2 and primarily a decreased ester number of 8.3.

*Example 4*

A sintered catalyst consisting of sintered $Fe_3O_4$ powder to which, based on iron, 1% $K_2O$ in the form of $K_2CO_3$ had been added (sintering temperature 1350° C., 2 hours) was reduced for 24 hours at 400° C. The syntheses which were effected at 10 atmospheres, a catalyst load of 100 parts by volume of gas per part by volume of catalyst per hour, a recycle ratio of 1:2.5 and a $CO:H_2$ ratio in the synthesis gas of 1:0.8 resulted in a liquid product which contained about 25% constituents boiling above 290° C.

If this product was treated for 2 hours at 130° C. and 140 atmospheres in the presence a cobalt hydrocarbonyl-containing solution with a gas consisting of 65% carbon monoxide, 25% hydrogen, the balance being nitrogen, the following characteristics as compared with those of the starting product were found:

|  |  | Starting product |
|---|---|---|
| Iodine number | 0 | 18 |
| Hydroxyl number | 19 | 17 |
| Carbonyl number | 2 | 0 |
| Neutralization number | 3.6 | 0 |
| Ester number | 12.7 | 1 |

I claim:

1. Process for the production of esters which comprises contacting an olefinic hydrocarbon having a carbon number above $C_{20}$ and boiling above 320° C. with a carbon monoxide hydrogen-containing gas having a $CO:H_2$ ratio of about 2:1 to about 50:1 at a temperature of 100-200° C. and a pressure of between 100 and 300 atmospheres in the presence of an oxo-catalyst, and recovering an ester.

2. Process according to claim 1, in which said olefinic hydrocarbon is obtained by the catalytic hydrogenation of carbon monoxide using iron catalysts for the formation of more than 20% paraffin in the liquid products.

3. Process according to claim 2, in which said olefinic hydrocarbon is obtained by the catalytic hydrogenation of carbon monoxide, using precipitated iron catalysts containing about 30-50% of free iron based on the total iron content.

4. Process according to claim 1, in which the reaction product of said contacting is subject to a caustic wash.

5. Process according to claim 1, in which any acids present in the reaction product obtained by said contacting are esterified with alcohol.

6. Process according to claim 5, in which said esterification is effected with alcohol obtained in the reaction product of said contacting.

References Cited in the file of this patent
UNITED STATES PATENTS

| 2,497,303 | Gresham et al. | Feb. 14, 1950 |
| 2,595,096 | Parker | Apr. 29, 1952 |
| 2,609,382 | Mayland | Sept. 2, 1952 |
| 2,727,056 | Gross et al. | Dec. 13, 1955 |